(12) United States Patent
Hämäläinen

(10) Patent No.: US 8,160,630 B2
(45) Date of Patent: Apr. 17, 2012

(54) METHOD AND ARRANGEMENT FOR CONTROLLING TRANSMISSION POWER AND A NETWORK ELEMENT

(75) Inventor: Seppo Hämäläinen, Espoo (FI)

(73) Assignee: Nokia Corporation, Espoo (FI)

( * ) Notice: Subject to any disclaimer, the term of this patent is extended or adjusted under 35 U.S.C. 154(b) by 1136 days.

(21) Appl. No.: 12/008,173

(22) Filed: Jan. 8, 2008

(65) Prior Publication Data

US 2008/0108315 A1      May 8, 2008

Related U.S. Application Data

(63) Continuation of application No. 10/110,867, filed on Jul. 10, 2002, now abandoned.

(30) Foreign Application Priority Data

Oct. 20, 1999   (FI) .................................... 19992270

(51) Int. Cl.
    *G06F 15/16*    (2006.01)
(52) U.S. Cl. ..................... 455/522; 455/127.1
(58) Field of Classification Search ............... 375/262, 375/265, 325, 340, 341, 296; 455/127.1, 455/127.2, 522
    See application file for complete search history.

(56) References Cited

U.S. PATENT DOCUMENTS

| | | | | |
|---|---|---|---|---|
| 5,333,175 | A | 7/1994 | Ariyavisitakul et al. | 379/58 |
| 5,839,056 | A | 11/1998 | Hakkinen | 455/69 |
| 5,946,346 | A | 8/1999 | Ahmed et al. | 375/219 |
| 6,215,827 | B1 | 4/2001 | Balachandran et al. | 375/262 |
| 6,226,526 | B1 | 5/2001 | Sakoda et al. | 455/522 |
| 6,414,946 | B1 | 7/2002 | Satou et al. | 370/328 |
| 6,529,482 | B1 | 3/2003 | Lundy | 370/252 |
| 2002/0080734 | A1 | 6/2002 | Satou et al. | 370/328 |
| 2002/0094836 | A1 | 7/2002 | Nakamura et al. | 455/522 |
| 2002/0111163 | A1 | 8/2002 | Hamabe | 455/423 |

FOREIGN PATENT DOCUMENTS

| | | |
|---|---|---|
| CA | 2 371 315 | 11/2000 |
| EP | 0853393 A1 | 7/1991 |
| EP | 0462952 A1 | 12/1991 |
| EP | 0709973 A1 | 5/1996 |
| EP | 0961417 A2 | 12/1999 |
| EP | 0963059 A2 | 12/1999 |
| JP | 11-196042 | 7/1999 |
| JP | 11-234203 | 8/1999 |
| JP | 2001-136122 | 5/2001 |
| WO | WO97/50197 | 12/1997 |

*Primary Examiner* — Sam Bhattacharya
(74) *Attorney, Agent, or Firm* — Harrington & Smith

(57) ABSTRACT

This invention relates to a method and arrangement for controlling transmission power in a mobile communications system, and to a network element. In the method according to the invention a certain target level is defined for a value representing the quality of a signal, which target level should be reached by the received signal. According to the invention this target level is advantageously limited so as to be smaller than or equal to a first predetermined limit value and/or greater than or equal to a second predetermined limit value. In accordance with the invention the quality of the signal may be measured e.g. by means of an SIR value. In the method according to the invention the quality of the received signal is checked and, based on the check, a first SIR target level is given to a comparing element (21). By means of the comparing element (21) it is ensured that the said first SIR target level falls within predetermined limits. Based on the comparison, a final SIR target level is given to a power control element (12) which produces a power control signal in order to adjust the transmission power.

20 Claims, 4 Drawing Sheets

METHOD AND ARRANGEMENT FOR CONTROLLING TRANSMISSION POWER AND A NETWORK ELEMENT

PRIORITY STATEMENT

This application is a continuation of U.S. patent application Ser. No. 10/110,867, filed on Jul. 10, 2002 now abandoned, and claims benefit thereof under 35 U.S.C. §120.

The invention relates to transmission power control in a mobile communications system. In particular the invention relates to power control in a CDMA system Transmission power control is used in order to achieve optimum transmission power at which data can be conveyed in the desired manner to the recipient. The aim is to realize error-free data transfer at sufficient transmission power, however without using excessive transmission power which consumes electric energy at the transmitting device and causes interference with other radio connections.

As is known, the adequacy of transmission power is measured as a ratio of signals to interferences at the receiving end. A common ratio is the so-called SIR (Signal to Interference Ratio) value indicating the ratio of signal power to the interference power. Another ratio which is used is the CIR (Carrier to Interference Ratio) value describing the ratio of carrier wave power to the interference power. In radio systems a target level is typically specified for the transmission power at the receiving end. Advantageously in each radio connection the transmission power is set such that the target level is just achieved. Because of the reasons mentioned above it is disadvantageous to set the transmission power higher than the target level. The target level may advantageously be specified as a range in which the transmission power is sufficient in order to transfer the information to the recipient without errors.

In prior-art solutions a target level or range is specified for the SIR value. This target level is a parameter transferred along with messages when negotiating on a bearer. A bearer refers here to the entity comprised of all the factors that are involved in the data transfer between a base station and a given terminal. The bearer concept includes, among other things, the data transfer rate, delay, bit error ratio and the variations in these within certain minimum and maximum values. One can think of the bearer as a data transfer path which is a produce of all these factors and which links a base station with a given terminal, providing a way to transfer payload data therebetween. One bearer typically, especially in modern systems, links one terminal with one base station. Multimode terminals may have several simultaneous bearers linking them with one base station. If the system is capable of macrodiversity combination the bearer(s) may link a terminal and a network through more than one base station simultaneously.

Figure 1:
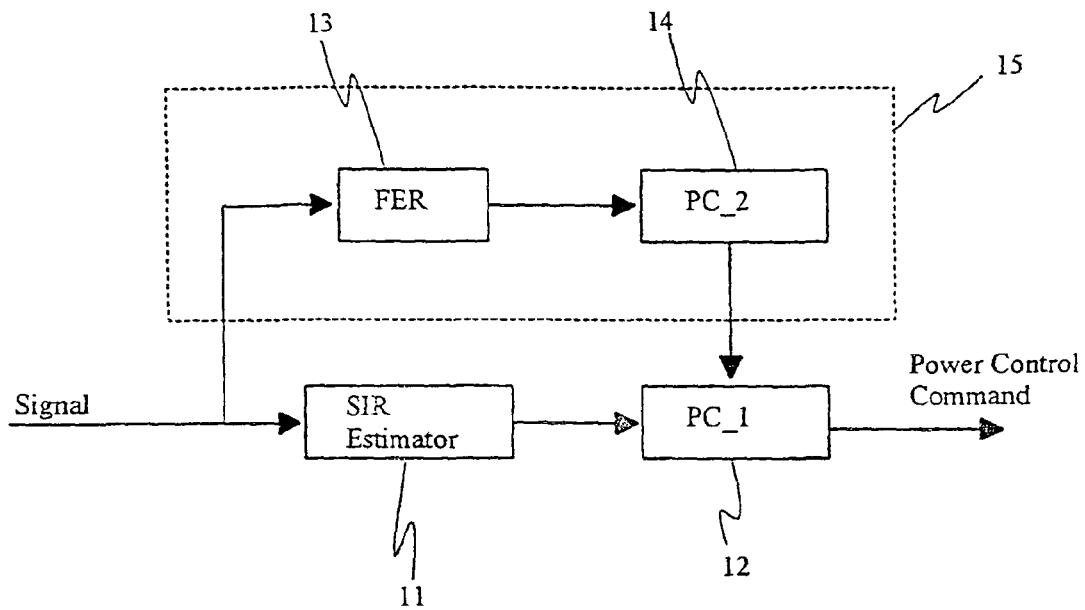

FIG. 1 shows a prior-art power control arrangement to control the transmission power in a mobile communications system, for example. The arrangement comprises a SIR estimator 11 to examine the quality of the incoming signal and to convey forward the information about the quality of the incoming signal using the SIR value, for example. The SIR estimator 11 gives the said SIR value to a power control element PC_1 12. The power control element PC_1 12 also receives another control through a quality loop 15. The quality loop comprises checking for errors in the signal, FER 13, which errors depend on the quality of the connection, whereby the loop is called a quality loop 15. On the basis of errors in the signal the transmission power is adjusted by means of the power control element PC_2 14 in the quality loop 15. According to the prior art the quality loop 15 operates in such a manner that if there are errors in the signal the SIR target level given by the quality loop 15 is raised. If no errors are detected in the signal the SIR target level is immediately dropped by one step which is usually smaller than a step upwards. The power control element PC_1 realizes a comparison on the basis of which the transmission power is adjusted. The transmission power is increased if the target level given by the quality loop 15 is higher than the control given by the SIR estimator 11. Otherwise the transmission power is decreased.

The problem associated with the arrangement according to the prior art may be illustrated through the following example. Let us assume that in the arrangement according to the example a terminal needs on average a SIR value of 15 dB in order to achieve a connection quality which is good enough, and that the terminal can achieve that SIR value. Let us further assume that the operating range of the SIR estimator 11 is from 0 to 14 dB, for instance. Initially, the SIR value given by the SIR estimator 11 and power control element PC_1 12 is set to 13 dB. Then, however, the quality of the connection is not good enough for data transfer. The quality loop 15 detects errors in the signal and instructs to increase the SIR value. In the exemplary prior-art solution the SIR value is increased in steps of 0.5 dB. As the maximum value of the SIR estimator is 14 dB and the SIR target level given by the quality loop 15 is higher than the said 14 dB, the transmission power is increased. At the same time the SIR target level is raised whereby the transmission power further increases. A certain transmission power value, which is high enough, produces a connection quality good enough, whereby the quality loop 15 starts to drop the SIR target level. The SIR target level is dropped in steps considerably smaller than those used to raise it, so that the transmission power increases as long as the SIR target level is smaller than the SIR value given by the SIR estimator. When the transmission power has increased too much, the connection in question interferes with other possible connections.

Figure 2:
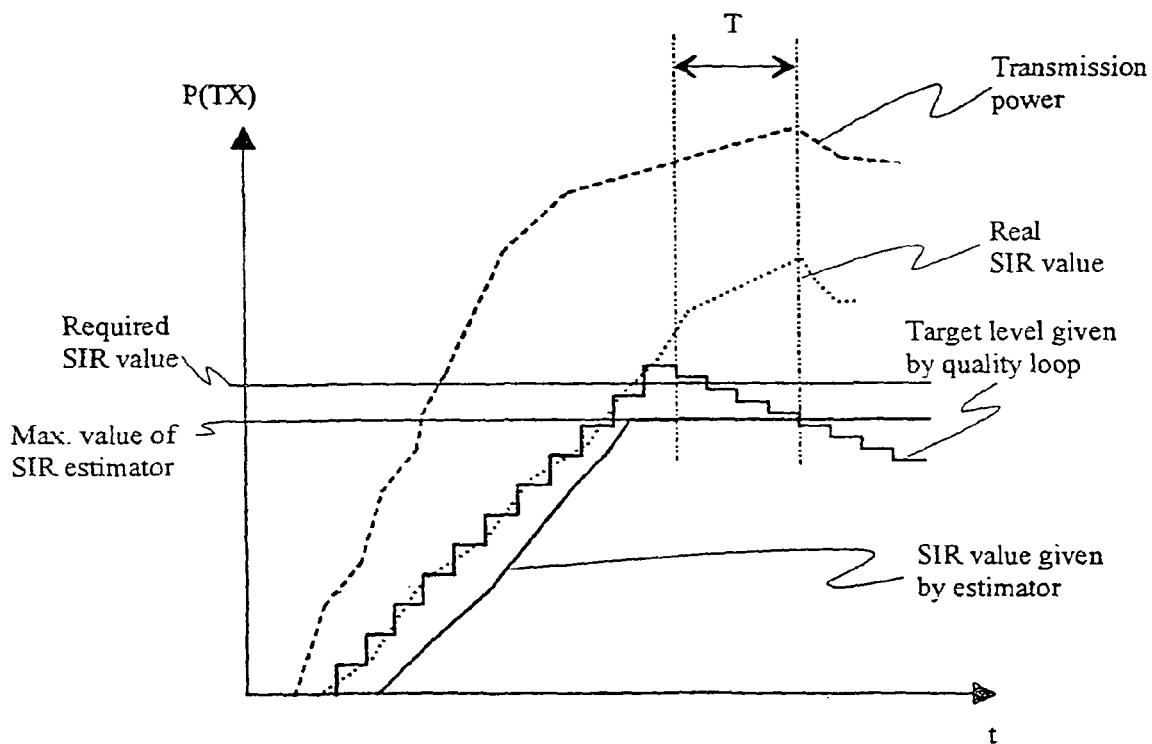

FIG. 2 illustrates the above-described problem relating to the arrangement according to the prior art. In the coordinate system of FIG. 2 there are depicted graphs for the transmission power, real SIR value, value given by the SIR estimator 11, and the increase in the value of the SIR target level given by the quality loop 15. The coordinate system shows the level required of the SIR value for the connection quality to be good enough, i.e. for the transmission power to be sufficient to transfer error-free data in the case in question. Moreover, the coordinate system shows the maximum value given by the SIR estimator 11. The target level given by the quality loop 15 increases as long as there are too many errors, i.e. the real SIR value is below the SIR value required. As can be seen from the figure the SIR value given by the SIR estimator 11 increases as the real SIR value increases, and reaches its maximum value or the upper limit of the SIR estimator output values. The SIR target level given by the quality loop 15 increases until the transmission power is high enough to transfer error-free data. In that case it may happen, just as illustrated in this example, that the SIR target level given by the quality loop 15 is at that moment higher than the greatest possible output value of the SIR estimator 11. Since the SIR value given by the SIR estimator 11 is smaller than the SIR target level given by the quality loop 15, the transmission power continues to be raised. The quality loop 15, in turn, begins to drop the SIR target level because the received signal is error-free to a sufficient extent. Transmission power is not reduced before the SIR target level drops below the maximum value of the SIR estimator. This may take quite a while as the quality loop decreases the SIR target level in steps smaller than those that are used to increase it. This time interval is marked T in FIG. 2. During this time, the transmission power is increased quite unnecessarily.

Let us consider another problem relating to the arrangement according to the prior art. A problematic situation may arise e.g. when the terminal is already transmitting at maximum power even though the SIR value given by the SIR estimator and the real SIR value are smaller than what would be required for sufficient quality. Thereby, the quality loop attempts to further raise the SIR target level still higher when in fact sufficient quality will never be achieved since the transmission power already is at its maximum. When the terminal e.g. moves on to such a geographical area where it achieves sufficient connection quality at a lower transmission power, the transmission power decreases slowly since the SIR target level given by the quality loop 15 has risen very high, coming down very slowly. Thus the terminal unnecessarily transmits at excessive power. Such a situation may arise e.g. as a result of a so-called corner effect. A corner effect means a rapid improvement of connection quality especially in urban areas. For example, on the different sides of one and the same block the connection quality may vary by up to tens of decibels. Then, in a situation where the transmission power on a first side of the block has risen to the maximum value the SIR target level of the said quality loop has been raised rather high. Moving on to the corner of the same block and further to a second side, where the connection quality is considerably improved, the transmission power stays high for a long time still because the quality loop 15 drops the SIR target level very slowly. A similar problem may arise in other similar situations in which the quality of the connection may vary considerably.

Figure 3:
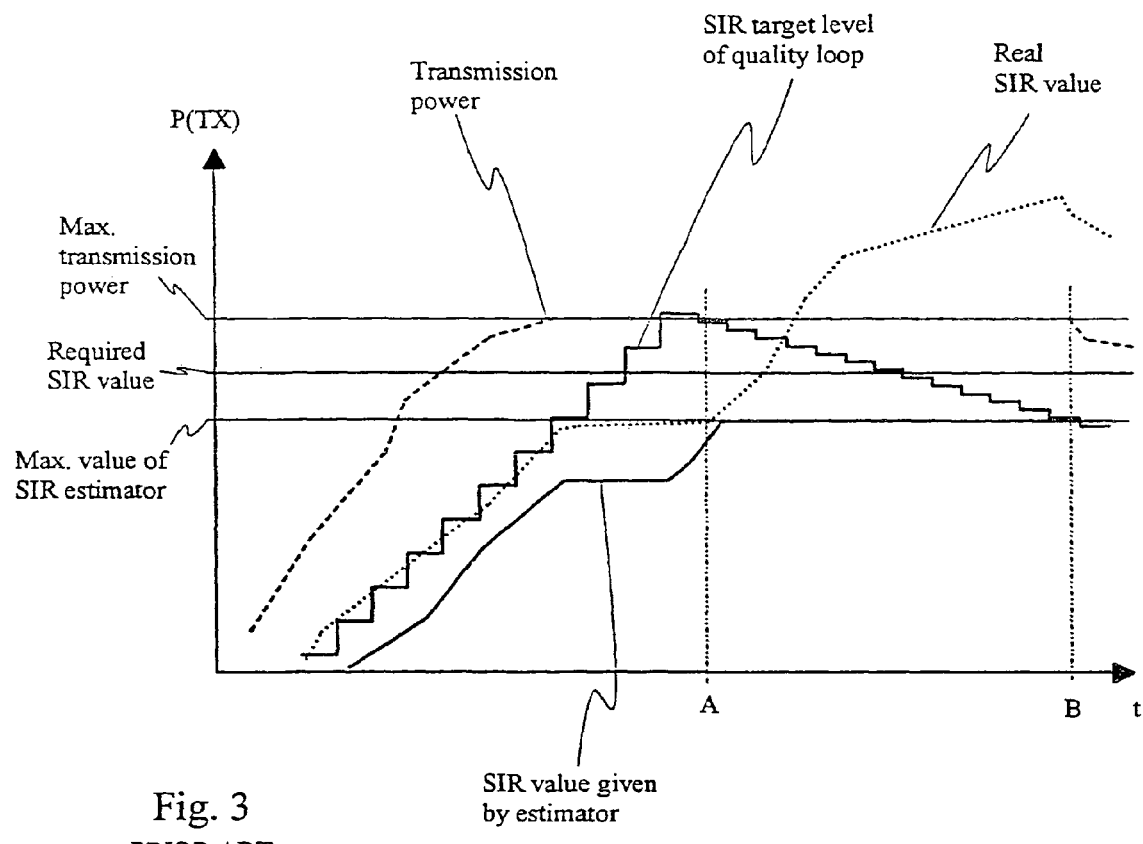

FIG. 3 illustrates the situation described above; showing in a coordinate system graphs for the transmission power, real SIR value, value given by the SIR estimator 11, and the SIR target level given by the quality loop 15. In addition the figure shows the maximum value of the SIR estimator and the SIR value required for sufficient connection quality. One can see from the figure that even though the real SIR value increases quickly (point A), as the connection quality gets better when the terminal moves away from behind an obstacle, for example, the transmission power does not drop simultaneously, not even approximately. Transmission power starts to decrease only when the SIR target level given by the quality loop 15 drops below the maximum value of the SIR estimator in order to achieve sufficient connection quality (point B).

An object of this invention is to eliminate the above-described disadvantages of the prior art.

The objects of the invention are achieved by setting an operating range for the said quality loop, which prevents excessive increase of transmission power.

The method according to the invention for controlling transmission power in a telecommunications system comprising at least one terminal and at least one network element and arranged so as to include at least a power control element and means for determining a value representing the quality of a signal is characterized in that a reference range is defined for limiting the value representing the quality of a signal,
a target level is defined for the value representing the quality of a signal,
the said target level for the value representing the quality of a signal is restricted to the said reference range.

The arrangement according to the invention for controlling transmission power, which arrangement comprises a power control element, is characterized in that the arrangement further comprises a first means for defining a reference range for the value representing the quality of a signal,
a second means for determining a first target level for the value representing the quality of a signal,
a comparing element for restricting the first target level for the value representing the quality of a signal to the said reference range in order to determine a final target level for the value representing the quality of a signal.

The network element according to the invention, which comprises a transmission power controller, is characterized in that the network element further comprises a first means for defining a reference range for the value representing the quality of a signal,
a second means for determining a first target level for the value representing the quality of a signal,
a comparing element for restricting the first target level for the value representing the quality of a signal to the said reference range in order to determine a final target level for the value representing the quality of a signal.

Other advantageous embodiments of the invention are specified in the dependent claims.

According to the invention limits are set for the target values, such as the SIR values, representing the quality of a signal, which limits define a reference range by means of which excessive increase of the transmission power can be prevented. Advantageously the limit for a first target value of the quality loop is arranged to be the same as a first limit output by the measuring element measuring the quality of the signal. A second target value may also be set for the quality loop, arranged to be the same or a little lower than a second limit output by the measuring element measuring the quality of the signal.

Figure 4:
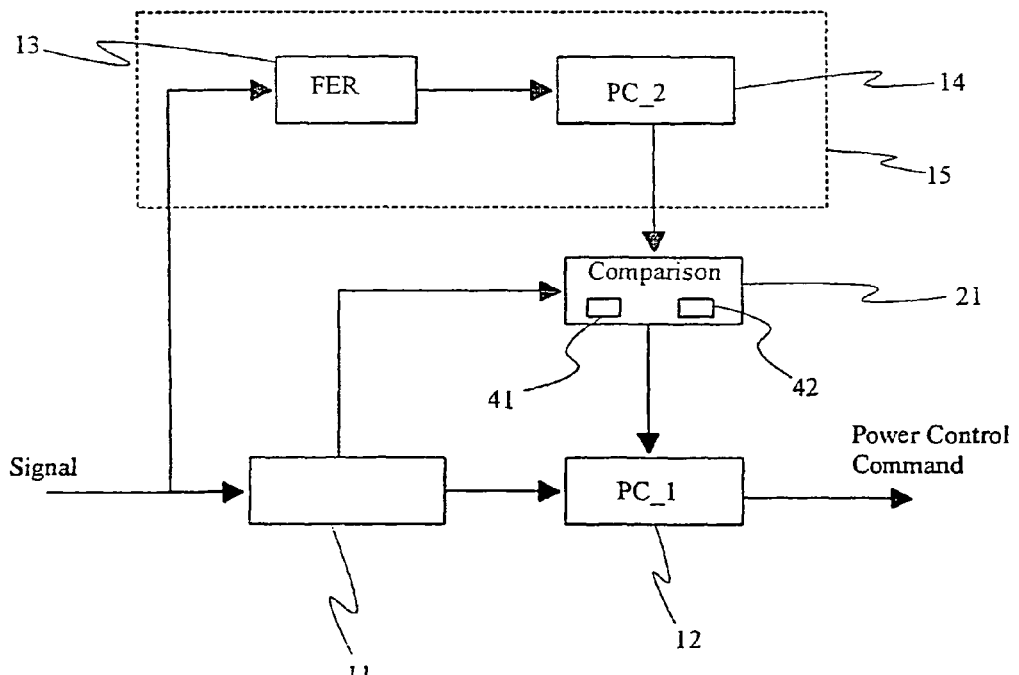
Figure 5:
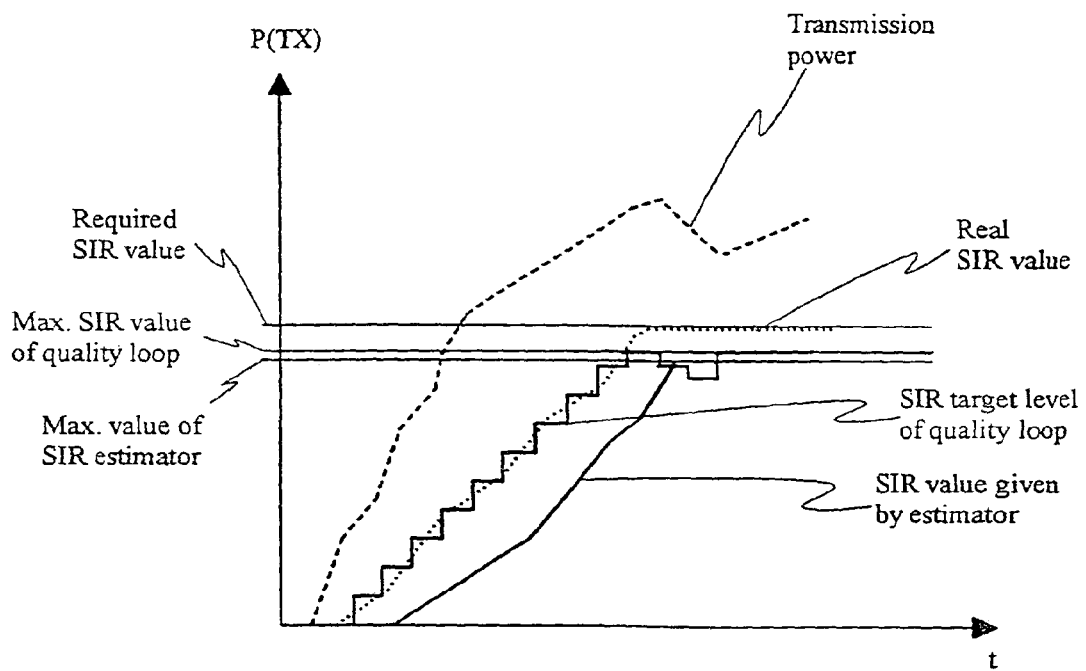
Figure 6:
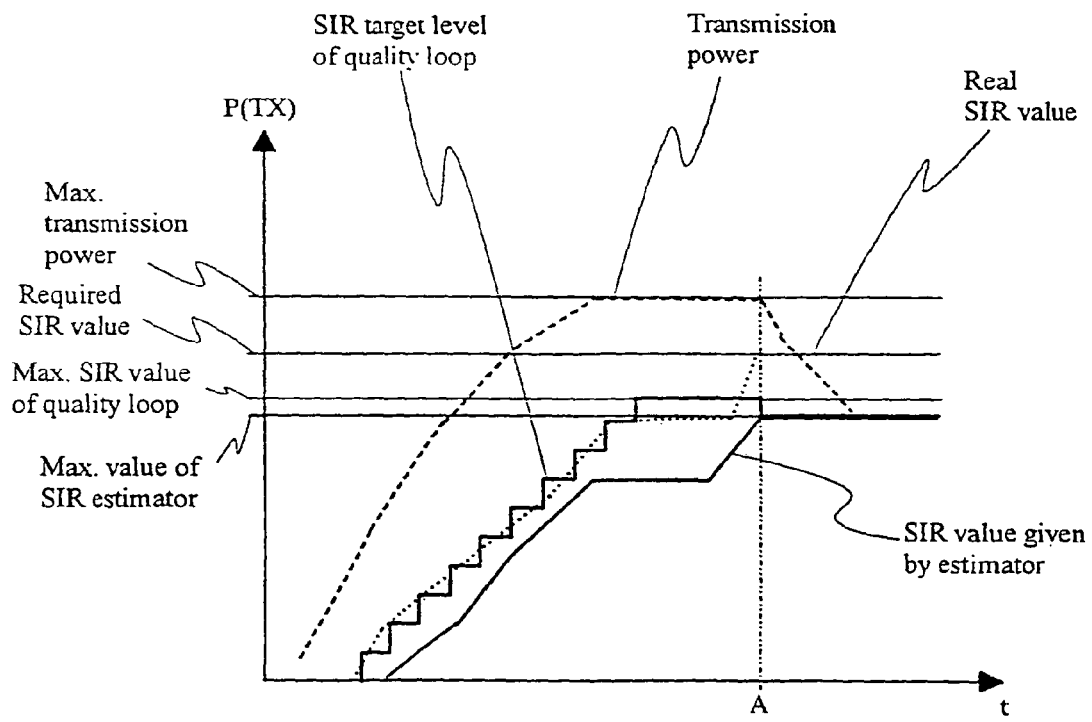
Figure 7:
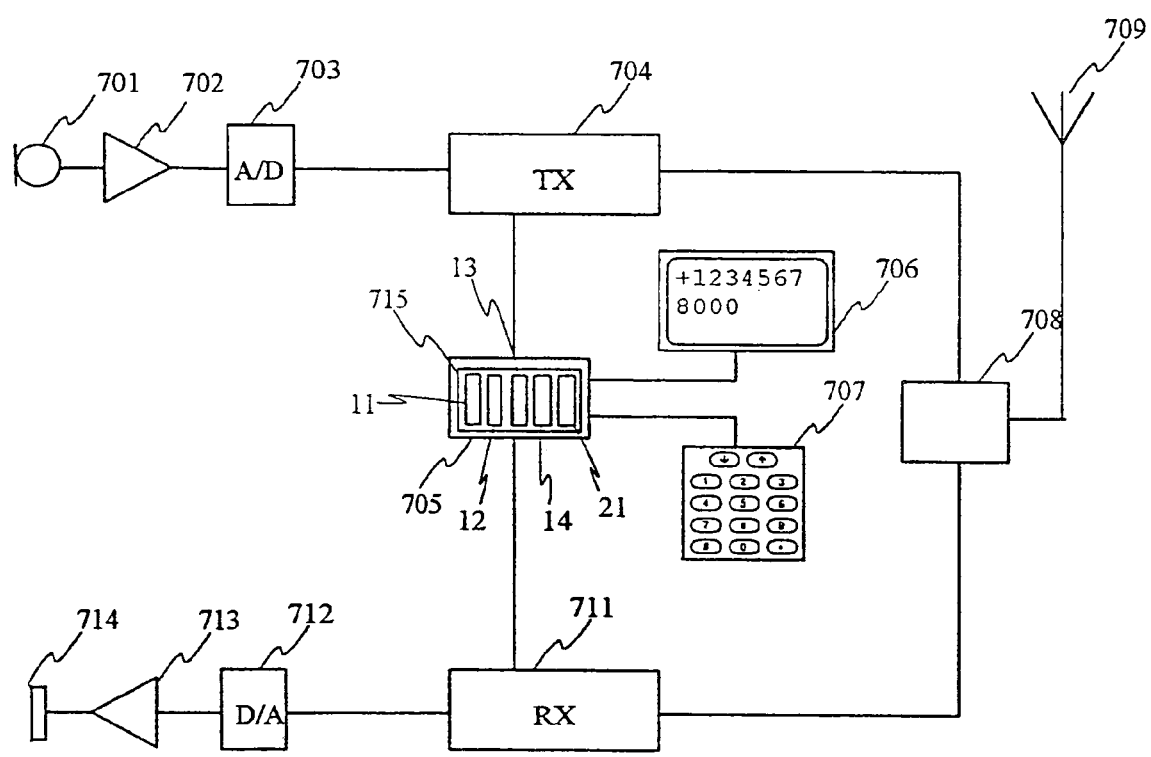

The invention is below described more closely, referring to the attached drawings in which FIG. 1 shows an arrangement according to the prior art for controlling power, FIG. 2 shows signals of an arrangement according to the prior art in a first problematic situation, FIG. 3 shows signals of an arrangement according to the prior art in a second problematic situation, FIG. 4 shows an arrangement according to the invention for controlling power, FIG. 5 shows signals of an embodiment according to the invention in a first situation, FIG. 6 shows signals of an embodiment according to the invention in a second situation, and FIG. 7 shows how an embodiment according to the invention is applied to a mobile station.

Like elements in the figures are denoted by like reference designators. FIGS. 1, 2 and 3 were discussed above in connection with the description of the prior art.

Let us next consider an arrangement realizing an arrangement for preventing excessive increase of transmission power. This is achieved by arranging the value representing the quality of the signal so as to have either an upper limit or a lower limit or both in order to limit the transmission power.

In an arrangement according to the invention the quality of the received signal is measured by a measuring element which gives to a first power control element a value representing the quality of the signal. The arrangement according to the invention further comprises a quality loop for measuring errors occurring in the received signal by means of an error checking means which controls a second power control element. The second power control element gives a target value for the value representing the quality of the signal which target value is compared in a comparing element. In the comparing element it is ensured that the target value stays within a reference range defined by predetermined limit values. From the comparing element the target value is given to the first power control element where the value representing the quality of the signal, given from the said measuring element, is also compared with the target value, and based on the comparison, the transmission power is adjusted. The said value representing the quality of the signal may be e.g. a SIR value, CIR value or any other similar value. In the following, we will be considering situations in which the value representing the quality of the signal is a SIR value. Furthermore, in the examples to follow the said measuring element is a SIR estimator arranged so as to at least measure the quality of a received signal and to output a corresponding characteristic. Here, the characteristic the SIR. It is obvious to a person skilled in the art that the selected values and the said elements may be other than those mentioned above as long as they can realize the corresponding functions.

FIG. 4 shows an arrangement according to the invention. The arrangement comprises a first means, such as a SIR estimator 11, arranged so as to have an operating range for controlling a value, such as a SIR value, representing the quality of a signal and which can be used to define a reference range for the value representing the quality of a signal. The arrangement according to the invention comprises a second means, such as a quality loop 15 corresponding to that of the prior art, including a signal error checking element FER 13 and power control element PC_2 14 to determine a target level for the value representing the quality of the signal. Advantageously the loop arrangement functions in such a manner that when there are errors in the signal the power control element PC_2 14 issues a control in order to adjust the value representing the quality of the signal by means of a first target level, such as a SIR target level, for the value representing the quality of the signal. In this exemplary embodiment the said target level is raised if there appear errors in the signal. If the signal is error-free within predetermined limits the target level is decreased. In this arrangement according to the invention there is a comparing element 21 between the power control element PC_2 14 of the quality loop 15 and the first power control element PC_1 12, to which comparing element the first SIR target level is conducted. From the said first means 11 the comparing element receives a reference range, such as limit values for the SIR value, so that it is possible to check and adjust in the comparing element 21, in accordance with the said reference range, the target level for the value representing the quality of the signal given by the power control element PC_2 14. The comparing element 21 outputs the final target level for the value representing the quality of the signal according to which the power control element PC_1 12 appropriately adjusts the power control signal controlling the transmission power based on a comparison between the value representing the quality of the signal coming from the first means 11 and the said final target level. Advantageously the final target level output by the comparing element is obtained from the first target level in such a manner that if the first target level is lower or higher than the limit values received from the first means 11 the final target level is adjusted to either the minimum or the maximum value of the said reference range. It is obvious to a person skilled in the art that according to an advantageous embodiment the reference range between the limit values given from the first means 11 to the said comparing element 21 is the same as the operating range of the first means 11, such as a SIR estimator. According to another advantageous embodiment the reference range between the limit values of the quality loop 15 is a range slightly wider than the operating range of the first means 11 but restricted, however, so that the transmission power cannot rise too much. Advantageously in a solution according to another embodiment the transmission power is increased if the target level exceeds the maximum value given by the first means 11. Otherwise the transmission power is decreased. It is obvious to one skilled in the art that according to the invention it is possible to provide just the upper limit value or just the lower limit value or both in order to control the transmission power. Furthermore, it is obvious to one skilled in the art that the upper limit value may be generally expressed as being equal to the maximum value of the operating range of the first means 11 added to a first predetermined constant; and; similarly, the lower limit value equals the minimum value of the operating range of the first means 11 added to a second predetermined constant. The said constant may have a positive or negative value or it may be zero.

It is obvious to a person skilled in the art that the above-described comparing element according to the invention comprises a first means 41 which ensures that the said target level for the value representing the quality of a signal is in accordance with the limits of the predetermined reference range, as described above, and a second means 42 in order to give the final target level, for the value representing the quality of the signal to the power control element 12.

We may study the operation of the arrangement according to the invention by examining the signal diagram shown in FIG. 5, which is corresponding to what is shown in FIG. 2 for a prior-art arrangement. The arrangement depicted illustrates a situation where there appear errors in the signal measured in the quality loop 15 whereby the value representing the quality of the signal given by the first means 11 is gradually increased as the quality loop 15 raises the target level higher. In this exemplary embodiment the said first means is a SIR estimator and the value representing the quality of the signal is the SIR value. As the target level rises, so does the transmission power in order to reduce the number of errors in the signal. In this case according to the invention, a maximum value has, been set for the SIR target level produced by the quality loop, which maximum value in this exemplary embodiment is slightly higher than the maximum value of the operating range of the SIR estimator 11. In this exemplary embodiment the maximum value of the operating range of the SIR estimator 11 is 14 dB and advantageously the maximum value of the SIR value produced by the quality loop 15 is 14.05 dB if the decrement step size in the quality loop 15 is 0.05 dB. The figure shows that the SIR value given by the SIR estimator 11 rises rather steadily up to the maximum value of the SIR estimator 11. The quality loop 15 has all the time been raising the SIR target level stepwise up since the values given by the SIR estimator do not produce a sufficient connection quality. As there are errors in the signal, whereby the SIR target level given by the quality loop 15 is higher than the SIR value given by the estimator, the transmission power is increased. When the real SIR value reaches the SIR value required for the connection quality to be sufficient, the SIR target level of the quality loop can be decreased. When the SIR target level given by the quality loop 15 has dropped below the maximum value of the SIR estimator, the transmission power can be decreased. If the SIR target level is not sufficient and there again occur errors in the signal, it is possible, in accordance with FIG. 5, to return to the SIR maximum value given by the quality loop and increase the transmission power. In this exemplary embodiment the maximum limit value given by the SIR estimator 11 is e.g. the said 14.05 dB. If the new SIR target level is not sufficient, the next adjustment step causes a return to the limited maximum value of the quality loop 15. As can be seen from FIG. 5, the real SIR value stays on the level required and the transmission power can be kept considerably lower than in solutions according to the prior art. It is obvious to one skilled in the art that the said numerical values for the SIR values are exemplary only and do not in any way limit the application of the solution according to the invention to other SIR values as well.

Let us next consider with the help of FIG. 6 how a solution according to the invention is applied to a situation similar to that shown in FIG. 3. In the case depicted in FIG. 6 the transmission power of a terminal has risen to its maximum even though the actual SIR value and the value given by the SIR estimator 11 are smaller than what would be required for a sufficient connection quality. Such a situation may arise e.g. in a shadow area where the quality of the connection cannot be brought to a sufficient level even when transmitting at full power. Since the SIR target level given by the quality loop 15 is limited in accordance with the invention, the SIR target level in this exemplary case stays at its maximum value up till when the real SIR value rises to the SIR value required for a sufficient connection quality. By way of example FIG. 6 shows the corner effect at moment A, as described above, where the quality of the connection is considerably improved at once. The real SIR value rises then immediately to a value that ensures sufficient connection quality. Conversely, the SIR target level given by the quality loop can be immediately decreased from its maximum by at least one step. Thereby, the SIR value given by the SIR estimator is greater than or at least equal to the SIR target level so that the transmission power can be decreased.

It is obvious to a person skilled in the art that the limit values for the said SIR value can be set as desired. The object, however, is that certain values will be defined for the SIR value estimation and for the maximum and minimum values of the quality loop by means of standardization, for example. Thus it can be ensured that the quality can be kept sufficient everywhere for connections of different operators. Standardization is particularly advantageous in an, arrangement where the comparison between the SIR value given by the quality loop and the SIR estimation range is arranged so as to be realized in a radio network controller (RNC) of a third-generation mobile communications network. According to the invention it is also possible to arrange for the SIR value only to have one limit value specified for it.

The power control arrangement according to the invention may be applied in a terminal, such as e.g. a mobile station, which utilizes a radio network in its connections. The power control arrangement, according to, the invention may be realized e.g. in the transmitter and receiver units of a mobile station, or the like. FIG. 7 shows an arrangement for, applying the solution according to the invention to a mobile station. The mobile station comprises typical parts, such as a microphone 701, keypad 707, display 706, earphone 714, transmit/receive switch 708, antenna 709, and a control unit 705. Additionally, the figure shows transmitter and receiver blocks 704, 711 typical of a mobile station. The transmitter block 704 comprises functions needed in speech encoding, channel encoding, encryption and modulation as well as RF functions. The receiver block 711 comprises the corresponding RF functions as well as the functions needed in demodulation, decryption, channel decoding and speech decoding. A signal coming from the microphone 701, amplified in an amplifier stage 702 and converted to digital form in an AD converter, is taken to the transmitter block 704, typically to a speech encoding element in the transmitter block. Having been processed, modulated and amplified in the transmitter block the signal is taken via the transmit/receive switch 708 to the antenna 709. A signal to be received is brought from the antenna via the transmit/receive switch 708 to the receiver block 711 which demodulates, decrypts and channel decodes the received signal. The resulting speech signal is taken via a D/A converter 712 to an amplifier 713 and further to the earphone 714. The control unit 705 controls the operation of the mobile station, reads control commands given by the user on the keypad 707 and sends messages to the user by means of the display 706. The power control arrangement 715 according to the invention may be realized e.g. in the control unit 705 of the mobile station, as shown in FIG. 7. The power control arrangement advantageously comprises the same or corresponding elements as the arrangement of FIG. 4, i.e. a means for determining a value representing the quality of the signal, such as a SIR estimator 11, a first power control element PC_1 12, a second power control element PC_2 14, an error checking element FER 13, and a comparing element 21. In this exemplary arrangement, frame errors or the like are detected in the received signal so that the transmission power can be controlled accordingly. It is obvious to a person skilled in the art that the arrangement according to the invention may be realized in other functional units of the mobile station as well.

According to another arrangement, the power control function may be realized in a base station BS. The arrangement according to the invention may then be realized e.g. in such a manner that measurements are carried out in the area of a given base station to ensure that the SIR value can be good enough in a certain area. The base station may be adapted so as to include an arrangement according to the invention which comprises the same or corresponding means as those described above. It is particularly advantageous to realize the arrangement in the transmitter and receiver units of the base station similarly as in the above-described case of the mobile station.

According to a third advantageous arrangement the comparison may be realized in a radio network controller RNC so that base station specific parameters used by the radio network controller specify the above-mentioned reference range for limiting the value representing the quality of the signal. Such an arrangement may also be realized in such a manner that the radio network controller RNC gives to the base stations the operating ranges for the means determining the value representing the quality of the signal and, if necessary, adjusts them e.g. in a situation where the said reference range differs from the said operating range. Advantageously the operating range and reference range data are stored in the radio network controller.

It is obvious to a person skilled in the art that a network element according to the invention which comprises a transmission power controller is adapted so as to include, in accordance with the invention, a first means for determining a reference range for a value representing the quality of a signal, a second means for determining a first target level for the value representing the quality of a signal, and a comparing element for limiting the said first target level for the value representing the quality of a signal to the said reference range in order to determine a final target level for the value representing the quality of a signal. A network element according to the invention may also comprise other means depending on the operation of the network element in question.

It is obvious to a person skilled in the art that the corresponding arrangement may also be realized in any network element in which functions related to power control may be performed. It is further obvious that the implementation of the method according to the invention may be divided between a plurality of network elements.

The arrangement according to the invention may be used e.g. in mobile communications networks to control the transmission power in order to reduce interference in the network. Advantageously the arrangement according to the invention finds utility e.g. in third-generation mobile communications networks, such as UMTS, in which wideband CDMA (WCDMA) technology is used in data transfer. Apart from mobile systems the arrangement according to the invention may also be used in other telecommunications systems where similar power control is performed.

It is obvious to a person skilled in the art that the arrangement according to the invention may be applied to other radio networks in which the transmission power is adjustable. The arrangement according to the invention which was presented above may also be realized in some other manner than that described above.

The invention claimed is:

1. A method comprising:
   obtaining a value representing an estimated quality of a received signal;
   defining a maximum reference value for controlling a target level for the quality of the received signal;
   in a quality loop, determining if there is an error in the received signal, and in response to determining that there is an error in the received signal, raising a first target level for the quality of the received signal;
   comparing the first target level to the maximum reference value and outputting the lesser of the two as a final target level for the quality of the received signal; and
   issuing a power control signal to increase transmission power according to the final target level and the value representing the estimated quality of the received signal.

2. The method of claim 1, wherein the estimated quality of the received signal is estimated signal to interference ratio or estimated carrier to interference ratio.

3. The method of claim 1, wherein defining the maximum reference value comprises setting the maximum reference value to equal a maximum range of an estimator that estimates the quality of the received signal.

4. The method of claim 1, wherein defining the maximum reference value comprises setting the maximum reference value equal to a maximum range of an estimator that estimates the quality of the received signal plus a predetermined constant.

5. The method of claim 1, wherein determining the first target level comprises applying the first target level at a first power control unit, and wherein issuing a power control signal to increase the transmission power is applied at a second power control unit.

6. The method of claim 1, wherein the received signal is sent over a wideband code division multiple access channel.

7. The method of claim 1, repeated using the same defined maximum reference value for so long as it is determined that there is an error in the received signal.

8. An apparatus comprising:
   an estimator configured to estimate a value representing a quality of a received signal;
   a memory configured to store a maximum reference value for controlling a target level for the quality of the received signal;
   a quality loop comprising a detector configured to determine if there is an error in the received signal, and a first power control unit having an input coupled to the output of the detector and configured to output a first target level for the quality of the received signal;
   a comparing unit configured to compare the first target level to the maximum reference value and to output the lesser of the two as a final target level for the quality of the received signal; and
   a second power control unit having an input coupled to the output of the comparing unit and configured to issue a power control signal to increase transmission power according to the final target level and the value representing the estimated quality of the received signal.

9. The apparatus of claim 8, wherein the estimated quality of the received signal is estimated signal to interference ratio or estimated carrier to interference ratio.

10. The apparatus of claim 8, wherein the maximum reference value is equal to a maximum of the range of the estimator.

11. The apparatus of claim 8, wherein the maximum reference value is equal to a maximum of the range of the estimator plus a predetermined constant.

12. The apparatus of claim 8, wherein the apparatus comprises a mobile station and the received signal is sent over a wideband code division multiple access channel.

13. The apparatus of claim 8, wherein the apparatus comprises a base station and the received signal is sent over a wideband code division multiple access channel.

14. The apparatus of claim 8, wherein the quality loop and the comparing unit are arranged to compare the output of the first power control unit to the stored maximum reference value for as long as the detector determines that the there is an error in the received signal.

15. An apparatus comprising:
   estimating means for estimating a value representing a quality of a received signal;
   storing means for storing a maximum reference value for controlling a target level for the quality of the received signal;
   a quality loop comprising error checking means for determining if there is an error in the received signal, and first power control means having an input coupled to the error checking means for outputting a first target level for the quality of the received signal;
   comparing means for comparing the first target level to the maximum reference value and for outputting the lesser of the two as a final target level for the quality of the received signal; and
   second power control means having an input coupled to the output of the comparing means and for issuing a power control signal to increase transmission power according to the final target level and the value representing the estimated quality of the received signal.

16. The apparatus of claim 15, wherein the estimated quality of the received signal is estimated signal to interference ratio or estimated carrier to interference ratio.

17. The apparatus of claim 15, wherein the maximum reference value is equal to a maximum of the range of the estimating means.

18. The apparatus of claim 15, wherein the maximum reference value is equal to a maximum of the range of the estimating means plus a predetermined constant.

19. The apparatus of claim 15, wherein the apparatus comprises a mobile station and the received signal is sent over a wideband code division multiple access channel.

20. The apparatus of claim 15, wherein the apparatus comprises a base station and the received signal is sent over a wideband code division multiple access channel.

* * * * *